United States Patent
Kurose et al.

(10) Patent No.: US 9,206,901 B2
(45) Date of Patent: Dec. 8, 2015

(54) SPHERICAL ANNULAR SEAL MEMBER

(71) Applicant: OILES CORPORATION, Minato-ku, Tokyo (JP)

(72) Inventors: Kouhei Kurose, Fujisawa (JP); Toshihiko Shimura, Fujisawa (JP); Osamu Miyashita, Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/443,784

(22) PCT Filed: Nov. 19, 2013

(86) PCT No.: PCT/JP2013/006767
§ 371 (c)(1),
(2) Date: May 19, 2015

(87) PCT Pub. No.: WO2014/080611
PCT Pub. Date: May 30, 2014

(65) Prior Publication Data
US 2015/0300494 A1    Oct. 22, 2015

(30) Foreign Application Priority Data
Nov. 21, 2012    (JP) .................................. 2012-255696

(51) Int. Cl.
| | |
|---|---|
| *F16J 15/32* | (2006.01) |
| *F16J 15/06* | (2006.01) |
| *F16J 15/10* | (2006.01) |
| *F01N 13/16* | (2010.01) |
| *F01N 13/18* | (2010.01) |

(52) U.S. Cl.
CPC ............... *F16J 15/062* (2013.01); *F01N 13/16* (2013.01); *F01N 13/1827* (2013.01); *F16J 15/102* (2013.01); *F16J 15/104* (2013.01)

(58) Field of Classification Search
CPC ...... F16J 15/126; F16J 15/0812; F16L 23/18; F01N 13/1827
See application file for complete search history.

(56) References Cited

U.S. PATENT DOCUMENTS

| | | | | |
|---|---|---|---|---|
| 4,607,851 | A * | 8/1986 | Usher | ..................... F01N 13/16 264/258 |
| 5,082,294 | A * | 1/1992 | Toth | ..................... F16J 15/3256 277/551 |
| 7,063,330 | B2 * | 6/2006 | Kubota | ................. F16L 27/073 277/627 |
| 2004/0207162 | A1 * | 10/2004 | Kubota | ................. F16J 15/126 277/650 |

(Continued)

FOREIGN PATENT DOCUMENTS

| | | |
|---|---|---|
| JP | 10-61775 | 3/1998 |
| JP | 2003-41932 | 2/2003 |

(Continued)

OTHER PUBLICATIONS

International Search Report for PCT/JP2013/006767, mailed Dec. 17, 2013, 4 pages.

*Primary Examiner* — Gilbert Lee
(74) *Attorney, Agent, or Firm* — Nixon & Vanderhye P.C.

(57) ABSTRACT

A spherical annular seal member 35 for use in an exhaust pipe joint includes: a spherical annular base member 33 defined by a cylindrical inner surface 29, a partially convex spherical surface 30, and large- and small-diameter side annular end faces 31 and 32 of the partially convex spherical surface 30; and an outer layer 34 formed integrally on the partially convex spherical surface 30 of the spherical annular base member 33.

14 Claims, 10 Drawing Sheets

(a)

(b)

(56) References Cited

U.S. PATENT DOCUMENTS

2010/0187771 A1* 7/2010 Waltenberg ......... F01N 13/1827 277/595
2010/0253011 A1* 10/2010 Maeda ................... F01N 13/08 277/626
2010/0270754 A1* 10/2010 Kubota ............... F01N 13/1827 277/608
2014/0027986 A1* 1/2014 Miyashita ........... F01N 13/1827 277/626

FOREIGN PATENT DOCUMENTS

| | | |
|---|---|---|
| JP | 2012-36916 | 2/2012 |
| JP | 2012-219980 | 11/2012 |
| WO | WO 2009/072295 | 6/2009 |
| WO | WO 2012/140868 | 10/2012 |

* cited by examiner

SPHERICAL ANNULAR SEAL MEMBER

This application is the U.S. national phase of International Application No. PCT/JP2013/006767 filed 19 Nov. 2013, which designated the U.S. and claims priority to JP Patent Application No. 2012-255696 filed 21 Nov. 2012, the entire contents of each of which are hereby incorporated by reference.

TECHNICAL FIELD

The present invention relates to a spherical annular seal member which is suitably used in a spherical pipe joint for an automobile exhaust pipe.

BACKGROUND ART

Exhaust gases of an automobile engine are released to the atmosphere through an exhaust pipe, and this exhaust pipe is subjected to repeated stress owing to such as the roll behavior and vibration of the engine, with the result that there is a possibility of causing a fatigue failure of the exhaust pipe, and there are also cases where the engine vibration causes the exhaust pipe to resonate, thereby deteriorating the quietness of the compartment interior. To overcome such problems, a means has been adopted to absorb the stress by disposing an exhaust pipe joint at a predetermined portion of the exhaust pipe.

As a spherical annular seal member which is used in the exhaust pipe joint, for example, one is proposed in Patent Document 1 which includes a spherical annular base member defined by a cylindrical inner surface, a partially convex spherical surface, and large- and small-diameter side annular end faces of the partially convex spherical surface; and an outer layer formed integrally on the partially convex spherical surface of this spherical annular base member.

PRIOR ART DOCUMENTS

Patent Document

Patent Document 1: WO 2009/072295

SUMMARY OF THE INVENTION

Problems to be Solved by the Invention

Meanwhile, in the case where such a spherical annular seal member is disposed at an end portion of the exhaust pipe extending in the vertical direction or diagonally downwardly, if there is a large clearance (fitting clearance) between the cylindrical inner surface of that spherical annular seal member and the outer peripheral surface of the end portion of the exhaust pipe, there is a possibility of the spherical annular seal member coming off the exhaust pipe and falling down during the assembly work, so that the assembly workability is poor. If the clearance is made small to prevent such coming off and falling down, it becomes difficult to dispose the spherical annular seal member at the end portion of the exhaust pipe due to the manufacturing error and the like. In any case, there has been a demand for improvement of the assembly workability.

The present invention has been devised on the basis of the above-described aspects, and its object is to provide a spherical annular seal member which makes it possible to eliminate the possibility of the spherical annular seal member falling down from the end portion of the exhaust pipe extending in the vertical direction or diagonally downwardly, thereby making it possible to improve the assembly workability.

Means for Overcoming the Problems

A spherical annular seal member in accordance with the present invention for use in an exhaust pipe joint comprises: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member, wherein at least three protrusions, which are formed of expanded graphite capable of being scraped off by an exhaust pipe when inserted into a through hole defined by the cylindrical inner surface and which extend between the large-diameter side annular end face and the small-diameter side annular end face in an axial direction at intervals with each other in a circumferential direction, are provided integrally on the cylindrical inner surface in such a manner as to protrude from the cylindrical inner surface in a direction toward an axis.

According to the spherical annular seal member in accordance with the present invention, since at least three protrusions, which are formed of expanded graphite capable of being scraped off by the exhaust pipe when inserted into the through hole defined by the cylindrical inner surface and which extend between the large-diameter side annular end face and the small-diameter side annular end face in the axial direction at intervals with each other in the circumferential direction, are provided integrally on the cylindrical inner surface in such a manner as to protrude from the cylindrical inner surface in a direction toward the axis, the cylindrical inner surface can be brought into close contact with an outer peripheral surface of an one end portion of the exhaust pipe by means of the protrusions, whereby it is possible to eliminate the possibility of the spherical annular seal member falling down from the exhaust pipe and improve the assembly workability. Moreover, it is possible to reduce as practically as possible the risk of leakage of exhaust gases through between the cylindrical inner surface and the outer peripheral surface of the exhaust pipe.

In the spherical annular seal member in accordance with the present invention, the large-diameter side annular end face may be constituted by an annular flat end face which is continuously connected at an annular large-diameter edge thereof to a large-diameter side annular end of the partially convex spherical surface and which is continuously connected at an annular small-diameter edge thereof to one annular axial end of the cylindrical inner surface. Alternatively, the large-diameter side annular end face may include an annular flat end face portion which is continuously connected at an annular large-diameter edge thereof to a large-diameter side annular end of the partially convex spherical surface and an annular concave end face portion which is continuously connected at a large-diameter edge thereof to an annular small-diameter edge of the annular flat end face portion and is continuously connected at a small-diameter edge thereof to one annular axial end of the cylindrical inner surface. Still alternatively, the large-diameter side annular end face may include an annular first concave end face portion which is continuously connected at the annular large-diameter edge to a large-diameter side annular end of the partially convex spherical surface, an annular flat end face portion which is continuously connected at an annular large-diameter edge thereof to an annular small-diameter edge of the first concave end face portion, and an annular second concave end face portion which is continuously connected at a large-diameter edge thereof to an annular small-diameter edge of the annular flat end face portion and is continuously connected at a small-diameter edge thereof to one annular axial end of the cylindrical inner surface. The annular concave end face portion which is continuously connected to one annular axial end of the cylindrical inner surface serves as a guide portion for positioning the spherical annular seal member with respect to one end portion of the exhaust pipe when the one end portion of the exhaust pipe is inserted into the through hole defined by the cylindrical inner surface, to thereby improve the operation of inserting the one end portion of the exhaust pipe into the through hole. In such a case, the protrusions may extend in the axial direction between the one axial end of the cylindrical inner surface and another axial end thereof.

In the spherical annular seal member in accordance with the present invention, the protrusions may extend to at least one of the one axial end of the cylindrical inner surface and the other axial end thereof, may terminate short of at least one of the one axial end of the cylindrical inner surface and the other axial end thereof, or may terminate short of one of the one axial end of the cylindrical inner surface and the other axial end thereof, and extend to another one of the one axial end of the cylindrical inner surface and the other axial end thereof. In a preferred example, the protrusions terminate at the one axial end of the cylindrical inner surface and extend to a position short of the other axial end of the cylindrical inner surface.

In the spherical annular seal member in accordance with the present invention, the protrusions may extend continuously or discontinuously in the axial direction, or may extend linearly in parallel with the axial direction, spirally in such a manner as to be inclined with respect to the axial direction, or in a corrugated manner in the axial direction.

The aforementioned at least three protrusions may be arranged at equal intervals with each other in a circumferential direction, and each of the protrusions in a cross section perpendicular to the axial direction may have a rounded triangular shape, a trapezoidal shape, or a semicircular shape, and preferably has a semicircular shape. These protrusions have a height of 1 mm or less, or 0.5 mm or less in a more preferred example, in a direction perpendicular to the axial direction.

The above-described cylindrical inner surface may have an inside diameter with respect to an outside diameter of a cylindrical outer surface of the exhaust pipe to ensure that a clearance more than a fitting clearance is not produced with respect to the cylindrical outer surface of the exhaust pipe inserted.

In the spherical annular seal member in accordance with the present invention, the spherical annular base member may include a reinforcing member made from a metal wire net and a heat-resistant material containing expanded graphite and compressed in such a manner as to fill meshes of the metal wire net of the reinforcing member and to be integrated with the reinforcing member in mixed form, and, in the outer layer, the heat-resistant material containing expanded graphite, a solid lubricant consisting of a lubricating composition containing at least hexagonal boron nitride and hydrated alumina, and the reinforcing member made from the metal wire net may be compressed such that the solid lubricant and the heat-resistant material are filled in the meshes of the reinforcing member, and such that the solid lubricant, the heat-resistant material, and the reinforcing member are integrated in mixed form, an outer surface of the outer layer being formed into a smooth surface in which surfaces constituted by the reinforcing member and surfaces constituted by the solid lubricant are present in mixed form or into a smooth surface constituted by the solid lubricant. According to such a spherical annular seal member, it is possible to avoid the dropping off of the solid lubricant from the outer surface, with the result that since the sliding with the mating member takes place at the smooth surface where the solid lubricant and the reinforcing member are present in mixed form or at the smooth surface constituted by the solid lubricant, it is possible to prevent the generation of abnormal frictional noise as practically as possible. In particular, if the outer surface of the outer layer is formed into the smooth surface where the solid lubricant and the reinforcing member are present in mixed form, the solid lubricant and the heat-resistant material transferred onto the mating member can be appropriately scraped off by the reinforcing member, so that it is possible to more effectively prevent the generation of abnormal frictional noise. In the aforementioned solid lubricant, hexagonal boron nitride exhibits excellent lubricity particularly in the high-temperature region. In addition, hydrated alumina itself among the components exhibits no lubricity, but exhibits an effect in the formation of a firm coating layer by improving the adhesiveness of the solid lubricant onto the heat material surface, and exhibits the role of deriving the lubricity of the hexagonal boron nitride by promoting sliding between layers of plate crystals of the hexagonal boron nitride.

The above-described lubricating composition may contain a polytetrafluoroethylene resin. The polytetrafluoroethylene resin itself has a low frictional property, and as it is contained in the lubricating composition, the polytetrafluoroethylene resin improves the low frictional property of the lubricating composition, imparts the low frictional property to the solid lubricant constituted of a lubricating composition, and is capable of avoiding as practically as possible the generation of abnormal frictional noise in the friction with the mating member without causing stick-slip (adhesion-slippage). Further, the polytetrafluoroethylene resin imparts the action of enhancing the ductility of the lubricating composition during compression forming, with the result that the formation of a thin coating layer is made possible.

The hydrated alumina is a compound which is expressed by a composition formula: $Al_2O_3 \cdot nH_2O$ (in the composition formula, $0<n<3$). In the composition formula, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot H_2O$) and diaspore ($Al_2O_3 H_2O$), alumina trihydrate such as gibbsite ($Al_2O_3 \cdot 3H_2O$) and bayerite ($Al_2O_3 \cdot 3H_2O$), pseudoboehmite, and the like, and at least one of them is suitably used.

In the spherical annular seal member in accordance with the present invention, the spherical annular base member and the outer layer contain the reinforcing member constituted by the metal wire net at a ratio of 40 to 65% by weight and the heat-resistant material containing the expanded graphite and the solid lubricant at a ratio of 35 to 60% by weight. The heat-resistant material and the solid lubricant in the spherical annular base member and the outer layer preferably have a density of 1.20 to 2.00 $Mg/m^3$. In addition, the outer layer preferably contains the reinforcing member constituted by the metal wire net at a ratio of 60 to 75% by weight and the heat-resistant material containing the expanded graphite and the solid lubricant at a ratio of 25 to 40% by weight.

If the spherical annular base member and the outer layer contain the reinforcing member by more than 65% by weight and the heat-resistant material by less than 35% by weight, the sealing (filling) of a multiplicity of infinitesimal passages (gaps) occurring around the reinforcing member by the heat-resistant material is not effected completely, with the result that leakage of exhaust gases can occur at an early period, and even if the sealing of the infinitesimal passages happened to be effected completely, such sealing can be lost at an early period due to the oxidative wear and the like of the heat-resistant material under high temperatures, leading to the leakage of exhaust gases at an early period. Meanwhile, if the reinforcing member is contained by less than 40% by weight, and the heat-resistant material is contained by more than 60% by weight, the amount of reinforcing member contained becomes quite small in the outer layer and in the vicinity of the outer layer, and the reinforcement of the heat-resistant material in the outer layer and in the vicinity of the outer layer fails to be effected satisfactorily, which can result in the noticeable occurrence of exfoliation (dropping off) of the heat-resistant material and makes it difficult to expect the effect of reinforcement by the reinforcing member.

In addition, as for the heat-resistant material and the solid lubricant in the spherical annular base member and the outer layer, if the heat-resistant material has a density of less than 1.20 $Mg/m^3$, the leakage of exhaust gases can result over extended periods of use, whereas if the heat-resistant material has a density of greater than 2.00 $Mg/m^3$, abnormal frictional noise is frequently liable to occur in the friction with the mating member.

In the spherical annular seal member in accordance with the present invention, since the outer layer has an outer surface which is formed by an exposed surface where surfaces constituted by the reinforcing member and surfaces constituted by the solid lubricant are present in mixed form, it is possible to ensure smoother sliding with the mating member which is in contact (slides) with the outer surface of the outer layer. In addition, the surface constituted by the solid lubricant in the outer surface can be held by the surface constituted by the reinforcing member, and it is possible to appropriately effect both the transfer of the solid lubricant from the outer surface of the outer layer onto the surface of the mating member and the scraping off of an excessive solid lubricant transferred onto the surface of the mating member, with the result that it is possible to ensure smooth sliding over extended periods of time, and the generation of abnormal frictional noise in sliding with the mating member can be eliminated.

In the spherical annular seal member in accordance with the present invention, the heat-resistant material may contain at least one of 0.05 to 5.0% by mass of phosphorus pentoxide and 1.0 to 16.0% by mass of a phosphate as an oxidation inhibitor, and expanded graphite.

The heat-resistant material containing at least one of phosphorus pentoxide and a phosphate as an oxidation inhibitor and expanded graphite is able to improve the heat resistance and oxidative wear characteristics of the spherical annular seal member itself, and permits the use of the spherical annular seal member in a high-temperature region.

Advantages of the Invention

According to the present invention, it is possible to provide a spherical annular seal member which makes it possible to eliminate the possibility of the spherical annular seal member falling down from the exhaust pipe, thereby making it possible to improve the assembly workability.

BRIEF DESCRIPTION OF THE DRAWINGS

Parts (a) and (b) of FIG. 1 are explanatory diagrams of an embodiment of the present invention.

Figure 4:
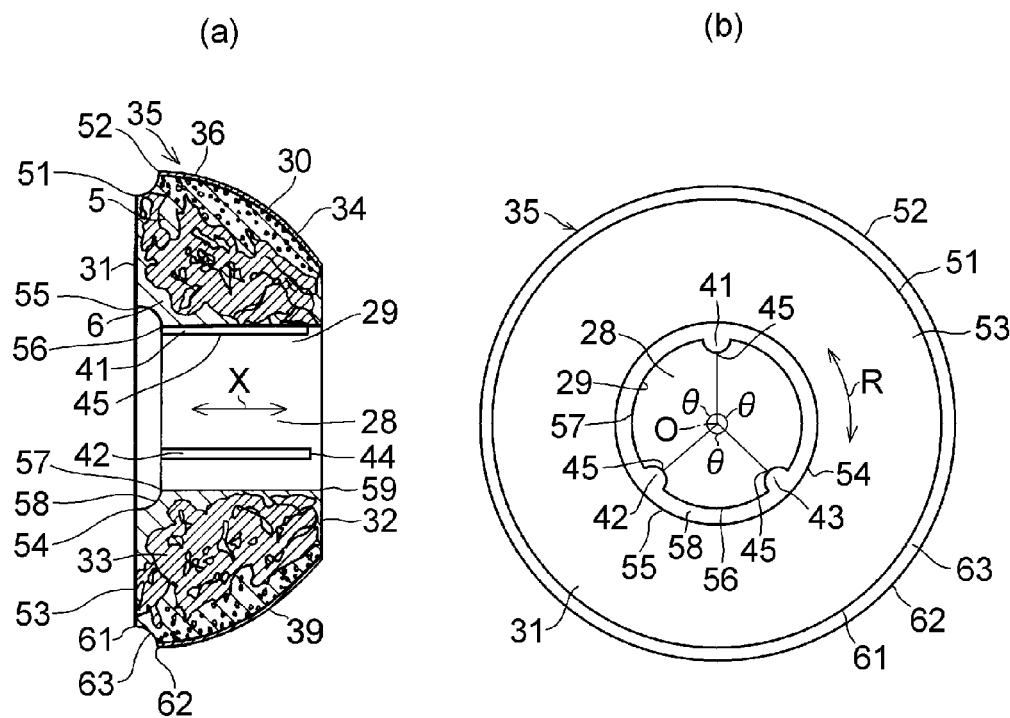
Figure 5:
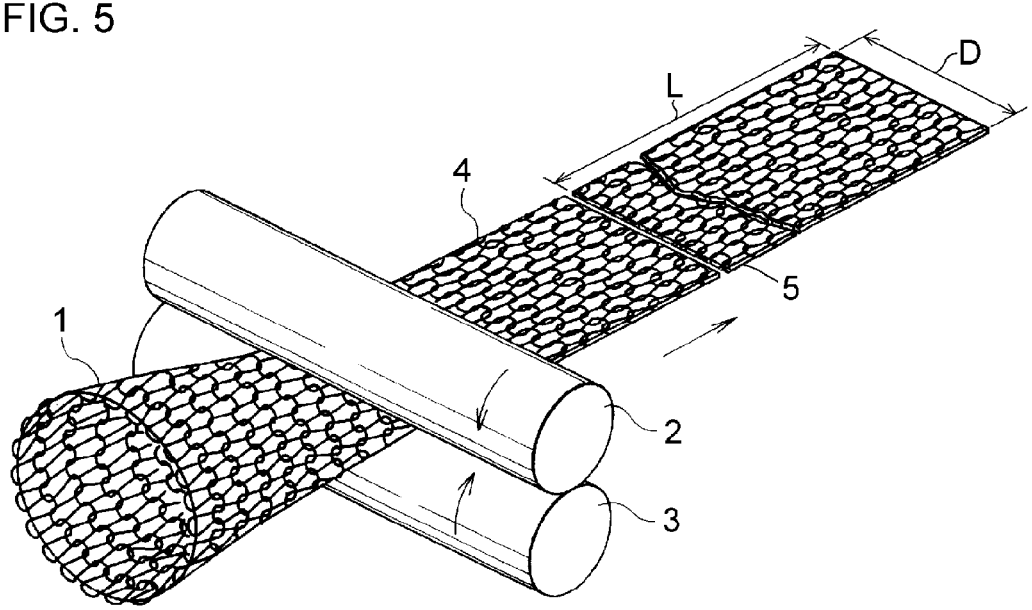
Figure 6:
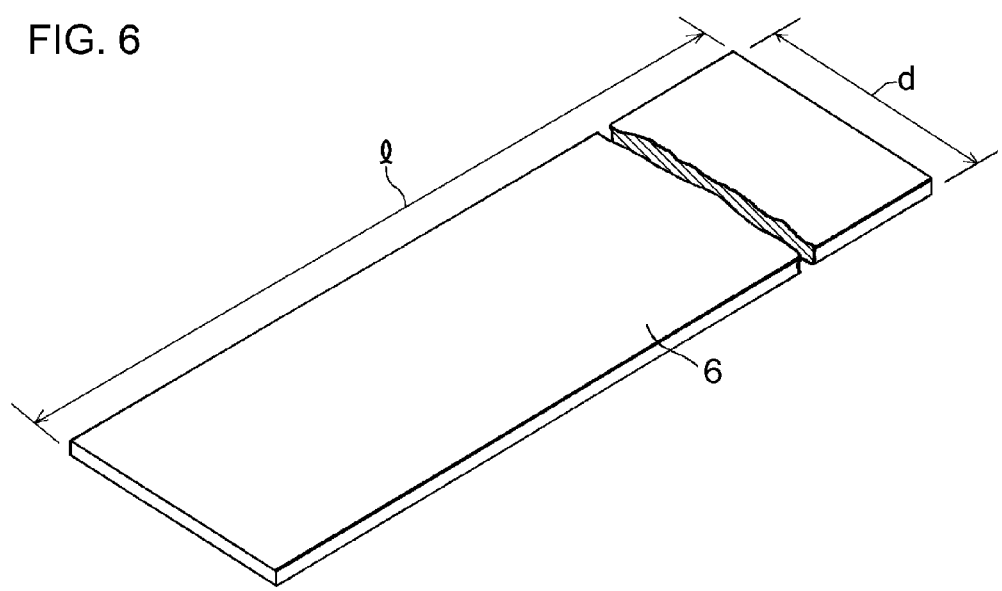
Figure 7:
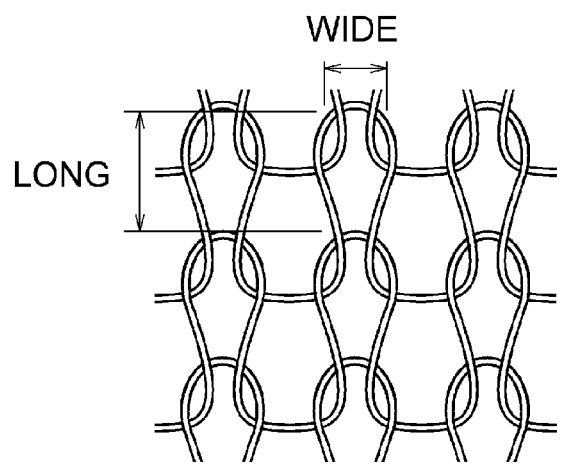
Figure 8:
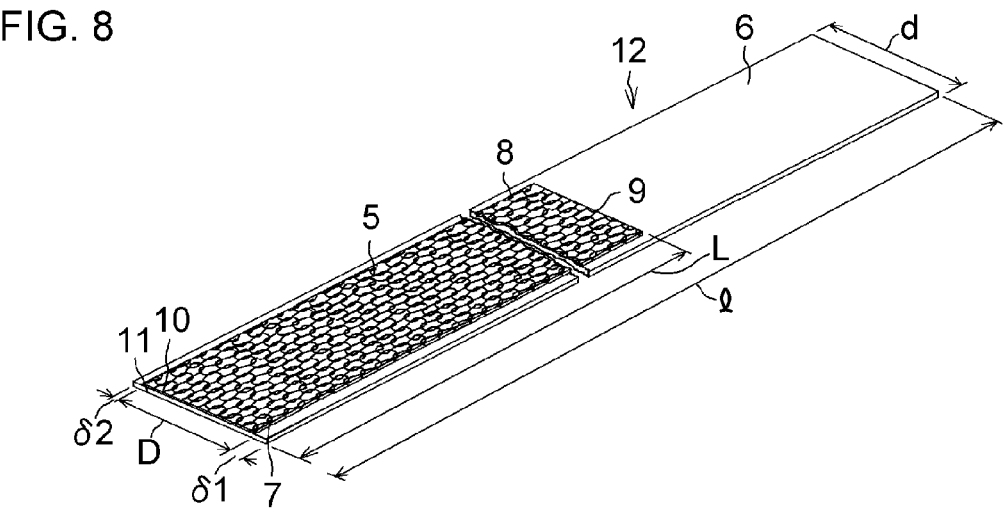
Figure 9:
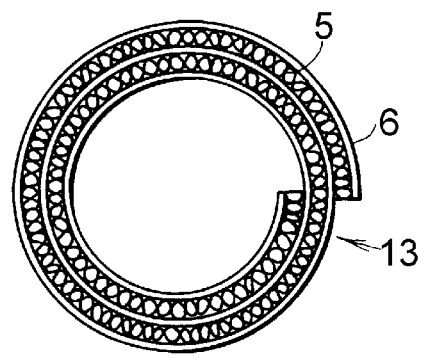
Figure 10:
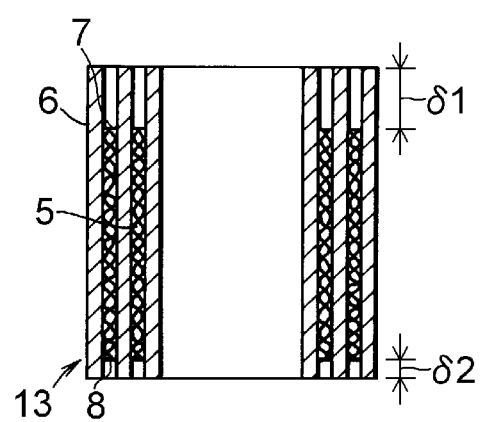
Figure 11:
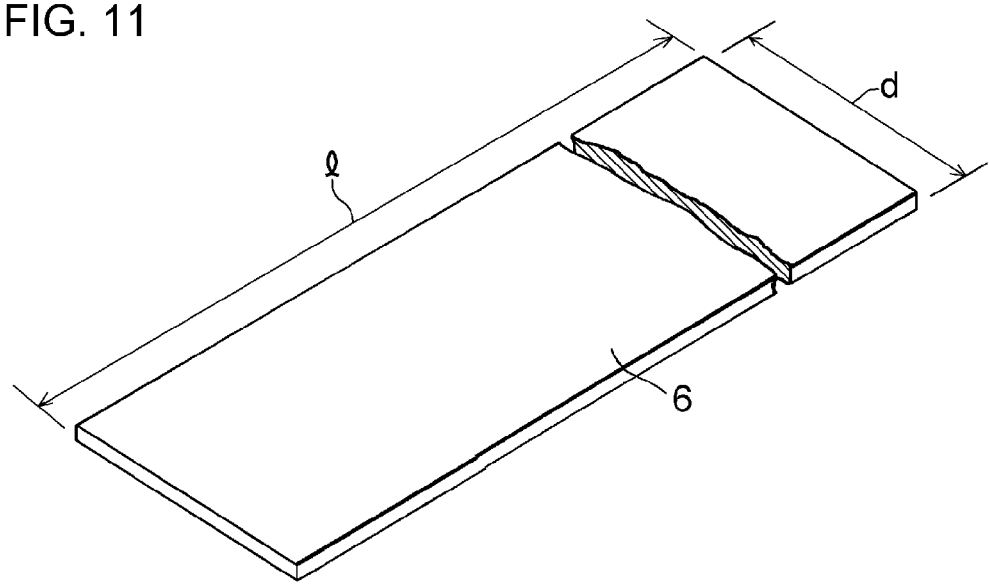
Figure 12:
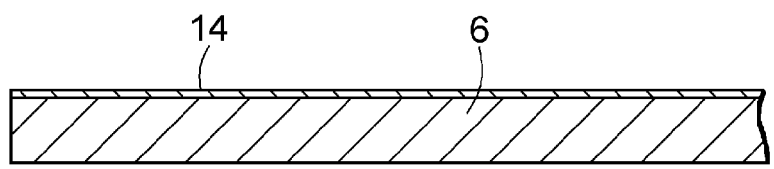
Figure 13:
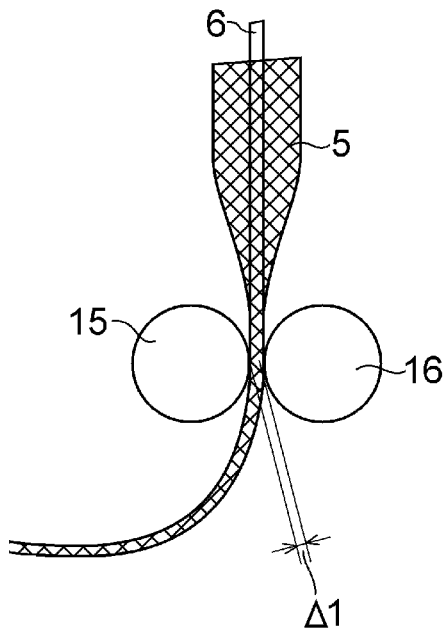
Figure 14:
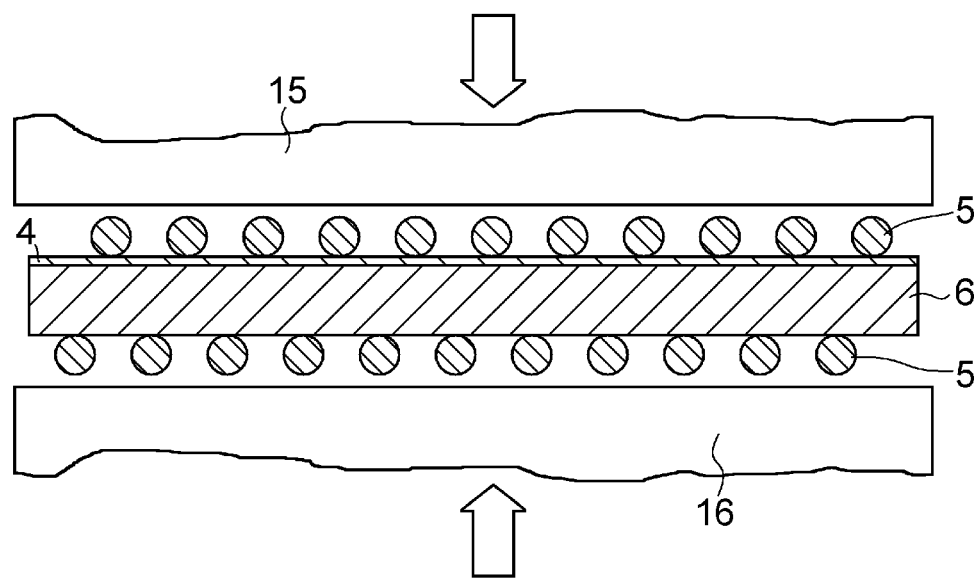
Figure 15:
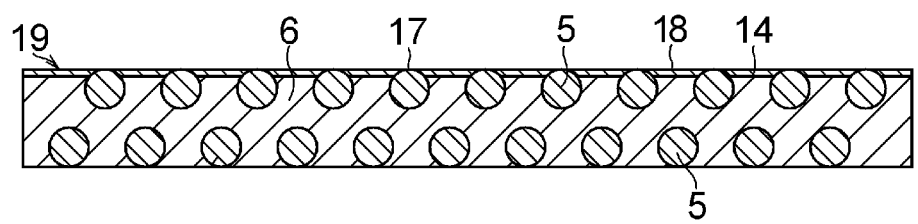
Figure 16:
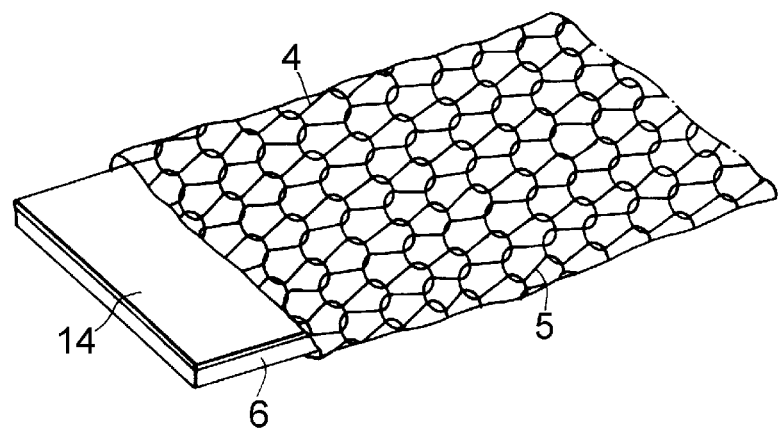
Figure 17:
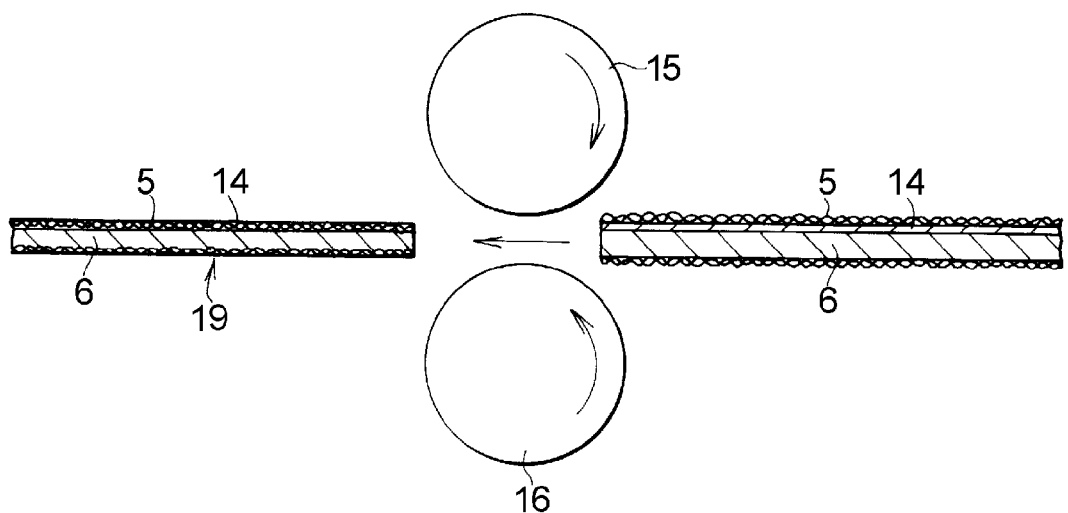
Figure 18:
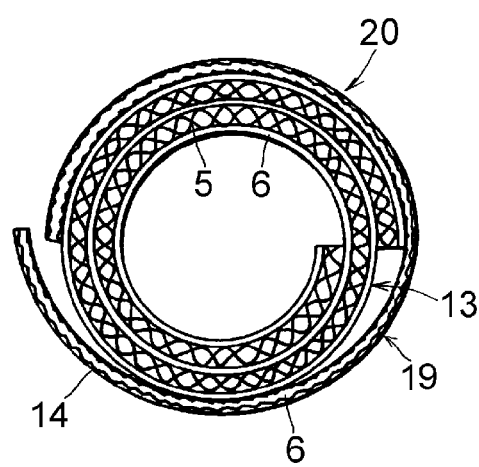
Figure 19:
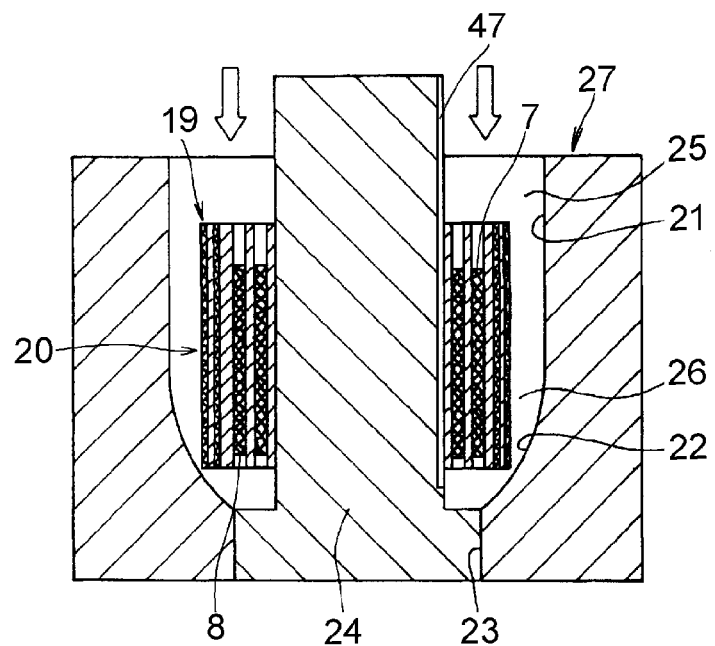
Figure 20:
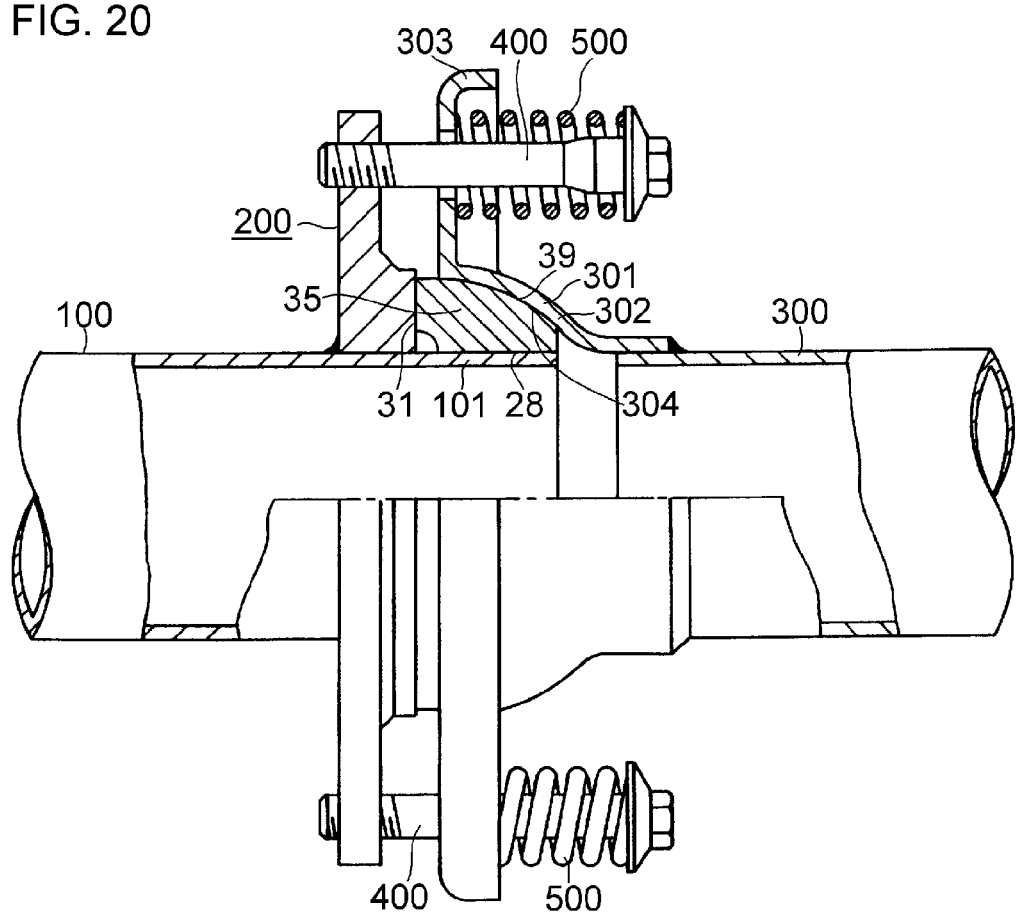

Parts (a) and (b) of FIG. 4 are explanatory diagrams of another embodiment of the present invention;

FIG. 5 is a diagram explaining a method of forming a reinforcing member in a process of manufacturing the spherical annular seal member in accordance with the present invention;

FIG. 6 is a perspective view of a heat-resistant material in the process of manufacturing the spherical annular seal member in accordance with the present invention;

FIG. 7 is a plan view illustrating meshes of a metal wire net of the reinforcing member;

FIG. 8 is a perspective view of a superposed assembly in the process of manufacturing the spherical annular seal member in accordance with the present invention;

FIG. 9 is a plan view of a tubular base member in the process of manufacturing the spherical annular seal member in accordance with the present invention;

FIG. 10 is a vertical cross-sectional view of the tubular base member shown in FIG. 9;

FIG. 11 is a perspective view of the heat-resistant material in the process of manufacturing the spherical annular seal member in accordance with the present invention;

FIG. 12 is a cross-sectional view of the heat-resistant material having a coating layer of a solid lubricant in the process of manufacturing the spherical annular seal member in accordance with the present invention;

FIG. 13 is a diagram explaining a first method of forming an outer-layer forming member in the process of manufacturing the spherical annular seal member in accordance with the present invention;

FIG. 14 is a diagram explaining the first method of forming the outer-layer forming member in the process of manufacturing the spherical annular seal member in accordance with the present invention;

FIG. 15 is a vertical cross-sectional view of the outer-layer forming member which is obtained by the first forming method in the process of manufacturing the spherical annular seal member in accordance with the present invention;

FIG. 16 is a diagram explaining a second method of forming the outer-layer forming member in the process of manufacturing the spherical annular seal member in accordance with the present invention;

FIG. 17 is a diagram explaining the second method of forming the outer-layer forming member in the process of manufacturing the spherical annular seal member in accordance with the present invention;

FIG. 18 is a plan view of a cylindrical preform in the process of manufacturing the spherical annular seal member in accordance with the present invention;

FIG. 19 is a cross-sectional view illustrating a state in which the cylindrical preform is inserted in a die in the process of manufacturing the spherical annular seal member in accordance with the present invention; and FIG. 20 is a vertical cross-sectional view of an exhaust pipe spherical joint incorporating the spherical annular seal member in accordance with the present invention.

MODE FOR CARRYING OUT THE INVENTION

Next, a more detailed description will be given of the present invention on the basis of the preferred embodiments illustrated in the drawings. It should be noted that the present invention is not limited to these embodiments.

Figure 1:
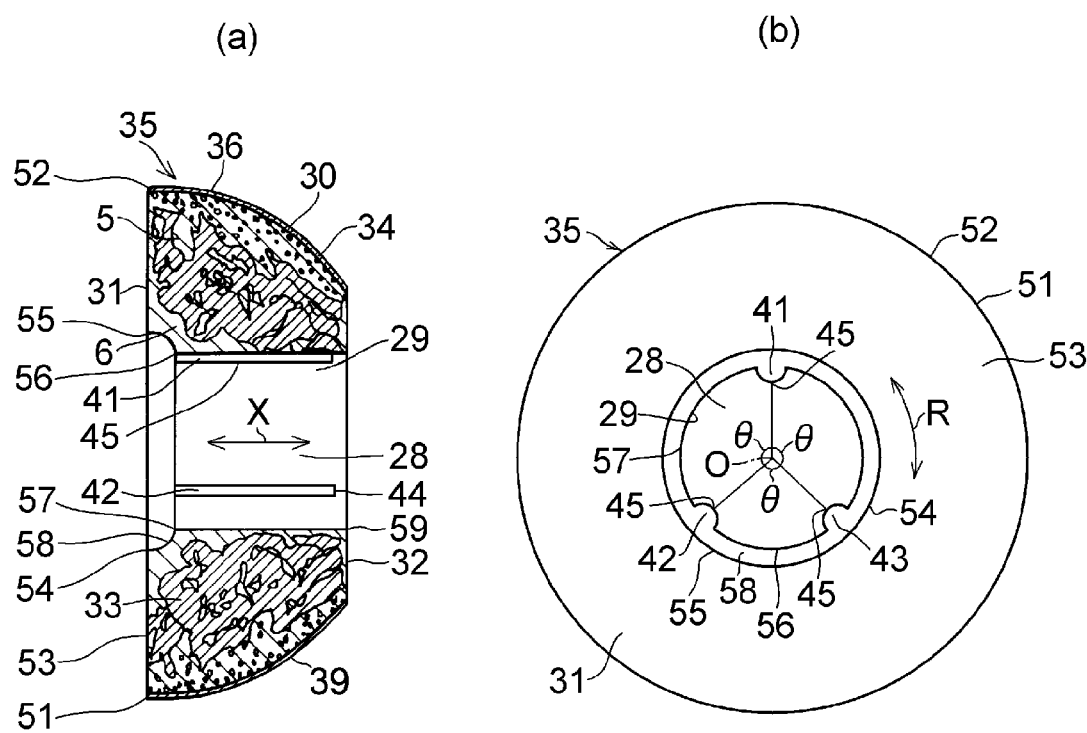
Figure 2:
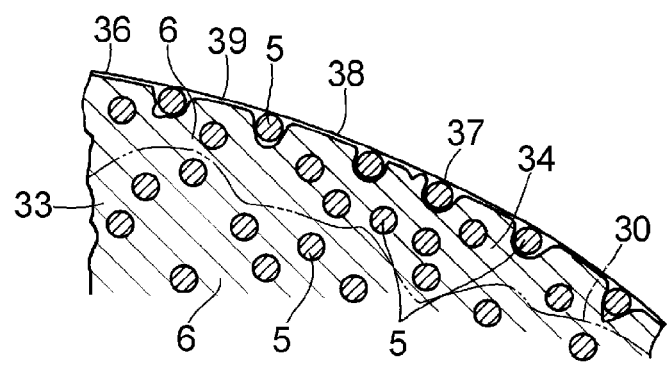
FIG. 2 is a partially enlarged explanatory diagram of a spherical annular seal member shown in FIG. 1.
Figure 3:
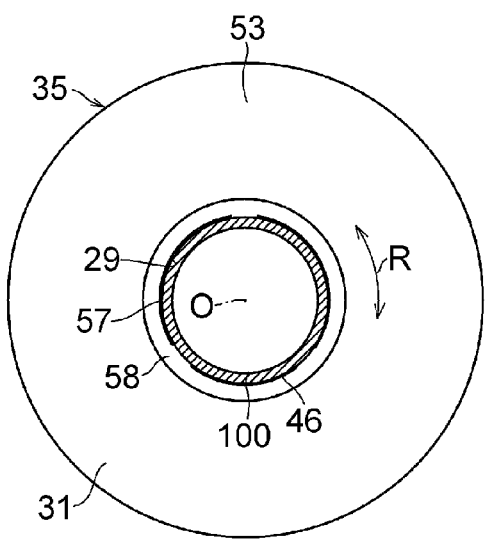
FIG. 3 is an explanatory diagram of use in the embodiment shown in FIG. 1.

In FIGS. 1 and 2, a spherical annular seal member 35 which is used in the exhaust pipe joint in accordance with this embodiment includes a spherical annular base member 33 defined by a cylindrical inner surface 29, a partially convex spherical surface 30, and large- and small-diameter side annular end faces 31 and 32 of the partially convex spherical surface 30; and an outer layer 34 formed integrally on the partially convex spherical surface 30 of the spherical annular base member 33.

To ensure that a clearance more than the fitting clearance is not produced with respect to a cylindrical outer surface 46 of an upstream-side exhaust pipe 100 inserted in a through hole 28 defined by the cylindrical inner surface 29, three protrusions 41, 42, and 43, which are formed of expanded graphite capable of being scraped off by the upstream-side exhaust pipe 100 when inserted and which extend continuously between the large-diameter side annular end face 31 and the small-diameter side annular end face 32 and linearly in parallel with an axial direction X at equal intervals with each other in a circumferential direction R, are provided integrally on the cylindrical inner surface 29 having an inside diameter with respect to the outside diameter of the cylindrical outer surface 46 in such a manner as to protrude from the cylindrical inner surface 29 in a direction toward the axis. The protrusions 41, 42, and 43 which terminate at 44 short of another end 59 in the axial direction X of the cylindrical inner surface 29 may be formed of expanded graphite alone.

The annular end face 31 in this embodiment has an annular flat end face portion 53 which is continuously connected at an annular large-diameter edge 51 thereof to a large-diameter side annular end 52 of the partially convex spherical surface 30, as well as an annular concave end face portion 58 which is continuously connected at a large-diameter edge 55 thereof to an annular small-diameter edge 54 of the annular flat end face portion 53 and is continuously connected at a small-diameter edge 56 thereof to one annular end 57 in the axial direction X of the cylindrical inner surface 29.

Instead of the annular end face 31 having the above-mentioned annular flat end face portion 53 and concave end face portion 58, the spherical annular seal member 35 may be constituted by, for example, an annular flat end face which is continuously connected at the annular large-diameter edge 51 to the large-diameter side annular end 52 of the partially convex spherical surface 30 and is continuously connected at the annular small-diameter edge 54 to the one annular end 57 in the axial direction X of the cylindrical inner surface 29.

The protrusions 41, 42, and 43, each of which has a semi-circular shape in a cross section perpendicular thereto to the axial direction X, extend in the axial direction X between the one end 57 in the axial direction X of the cylindrical inner surface 29 and the other end 59 thereof. Although the protrusions 41, 42, and 43 terminate short of the other end 59 in the axial direction X of the cylindrical inner surface 29 and extend to the one end 57 in the axial direction X of the cylindrical inner surface 29, the protrusions 41, 42, and 43 may alternatively extend, for example, to the one end 57 and to the other end 59, respectively, or may terminate short of the one end 57 and the other end 59.

A center angle θ formed by protruding ends 45 of the protrusions 41 and 42 and an axis O, a center angle θ formed by the protruding ends 45 of the protrusions 42 and 43 and the axis O, and a center angle θ formed by the protruding ends 45 of the protrusions 43 and 41 and the axis O are mutually equal angles, respectively.

When the spherical annular seal member 35 is installed on the upstream-side exhaust pipe 100, the upstream-side exhaust pipe 100 is inserted in the through hole 28, and the respective protrusions 41, 42, and 43 including the protruding ends 45 are scraped off by the upstream-side exhaust pipe 100. As a result, particularly the protrusions 41, 42, and 43 in the cylindrical inner surface 29 which is brought into contact with a cylindrical outer surface 46 of the upstream-side exhaust pipe 100 are brought into close contact with the cylindrical outer surface 46 of the upstream-side exhaust pipe 100, so that it is possible to eliminate the possibility of the spherical annular seal member 35 falling down from the upstream-side exhaust pipe 100, thereby making it possible to improve the assembly workability.

Although the spherical annular seal member 35 has the protrusions 41, 42, and 43 which extend continuously and linearly in parallel with the axial direction X, as shown in FIG. 1 for example, the spherical annular seal member 35 may alternatively have protrusions which extend discontinuously and linearly in parallel with the axial direction X. Still alternatively, the spherical annular seal member 35 may have protrusions which extend spirally in the axial direction X in such a manner as to be inclined with respect to the axial direction X, or in a corrugated manner in the axial direction and continuously or discontinuously. Furthermore, although the spherical annular seal member 35 in this embodiment has the three protrusions 41, 42, and 43, the spherical annular seal member 35 may alternatively have more than three protrusions which are arranged at mutually equal intervals in the circumferential direction R. Still further, the spherical annular seal member 35 may have, in substitution of or in addition to the above-described arrangements, an annular concave end face portion 63 which is continuously connected at a small-diameter edge 61 thereof to the large-diameter edge 51 and is continuously connected at a large-diameter edge 62 thereof to the annular end 52 of the partially convex spherical surface 30, as shown in parts (a) and (b) of FIG. 4. In such a case, the small-diameter edge 54 of the annular flat end face portion 53 may be continuously connected to the one end 57 of the cylindrical inner surface 29 directly or via the concave end face portion 58.

Hereafter, a description will be given of constituent materials of the spherical annular seal member 35 and a method of manufacturing the spherical annular seal member 35.

<Concerning Heat-Resistant Material I>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., natural flake graphite powder having a particle size of 30 to 80 meshes is added to it, and reaction is allowed to take place for 30 minutes. After the reaction, acid-treated graphite powder is separated by suction filtration, and a cleaning operation is repeated twice in which the acid-treated graphite powder is agitated in water for 10 minutes and is then subjected to suction filtration, thereby sufficiently removing the sulfuric acid content from the acid-treated graphite powder. Then, the acid-treated graphite powder with the sulfuric acid content sufficiently removed is dried for 3 hours in a drying furnace held at a temperature of 110° C., and this is used as an acid-treated graphite powder.

The above-described acid-treated graphite powder is subjected to heating (expansion) treatment for 1 to 10 seconds at temperatures of 950 to 1200° C. to produce cracked gas. The gaps between graphite layers are expanded by the gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet having a desired thickness. This expanded graphite sheet is used as a heat-resistant material I.

<Concerning Heat-Resistant Materials II and III>

While the above-described acid-treated graphite powder is being agitated, a solution in which at least one of an aqueous solution of orthophosphoric acid of an 84% concentration as a phosphoric acid and an aqueous solution aluminum primary phosphate of a 50% concentration as a phosphate is diluted with methanol is compounded with that acid-treated graphite powder by spraying, and is agitated uniformly to fabricate a mixture having wettability. This mixture having wettability is dried for two hours in a drying furnace held at a temperature of 120° C. Then, this mixture is subjected to heating (expansion) treatment for 1 to 10 seconds at temperatures of 950 to 1200° C. to produce cracked gas. The gaps between graphite layers are expanded by the gas pressure to form expanded graphite particles (expansion rate: 240 to 300 times). In this expansion treatment process, the orthophosphoric acid among the components undergoes dehydration reaction and produces phosphorus pentaoxide, and water in the structural formula of aluminum primary phosphate is eliminated. These expanded graphite particles are fed to the twin roller apparatus adjusted to a desired roll nip and is subjected to roll forming, thereby fabricating an expanded graphite sheet having a desired thickness. These expanded graphite sheets are used as heat-resistant materials II and III.

Phosphorus pentaoxide or aluminum primary phosphate is contained in the heat-resistant material II thus fabricated, and phosphorus pentaoxide and aluminum primary phosphate are contained in the heat-resistant material III. The expanded graphite containing at least one of phosphorus pentaoxide and aluminum primary phosphate permits use at, for instance, 500° C. or a high-temperature region exceeding 500° C. since the heat resistance of the expanded graphite itself is improved and the oxidation inhibiting action is imparted thereto.

Here, as the phosphate which can be used, it is possible to cite, in addition to the orthophosphoric acid, metaphosphoric acid, polyphosphoric acid, polymetaphosphate, and the like. In addition, as the phosphate, it is possible to cite, in addition to the aluminum primary phosphate, lithium primary phosphate, lithium secondary phosphate, calcium primary phosphate, calcium secondary phosphate, aluminum secondary phosphate and the like.

As the heat-resistant sheet material, a sheet material having a density of 1.0 to 1.15 Mg/m$^3$ or thereabouts and a thickness of 0.3 to 0.6 mm or thereabouts is preferably used.

<Concerning Reinforcing Member>

As a reinforcing member, a metal wire net is used which is formed by weaving or knitting one or more fine metal wires including, as an iron-based wire, a stainless steel wire made of such as austenitic stainless steels SUS 304, SUS 310 S, and SUS 316, a ferritic stainless steel SUS 430, or an iron wire (JIS-G-3532) or a galvanized steel wire (JIS-G-3547), or, as a copper wire, a wire member made of a copper-nickel alloy (cupro-nickel) wire, a copper-nickel-zinc alloy (nickel silver) wire, a brass wire, or a beryllium copper wire.

As the fine metal wire for forming the metal wire net, a fine metal wire whose diameter is 0.28 to 0.32 mm or thereabouts is used. In terms of the mesh size of the metal wire net (see FIG. 7 illustrating a woven metal wire net) for a spherical annular base member net formed by the fine metal wire of that diameter, a mesh size of 4 to 6 mm long and 3 to 5 mm wide or thereabouts is suitably used, whereas, in terms of the mesh size (see FIG. 7) of the metal wire net for an outer layer, a mesh size of 2.5 to 3.5 mm long and 1.5 to 5 mm wide or thereabouts is suitably used.

<Concerning Solid Lubricant>

A solid lubricant in this embodiment consists of a lubricating composition which contains 70 to 85% by weight of a hexagonal boron nitride (hereafter abbreviated as 'h-BN'), 0.1 to 10% by weight of boron oxide, and 5 to 20% by weight of hydrated alumina, or a lubricating composition which contains a polytetrafluoroethylene resin (hereafter referred to as PTFE) powder at a ratio of not more than 200 parts by weight, preferably 50 to 150 parts by weight, with respect to 100 parts by weight of that lubricating composition.

The aforementioned solid lubricant contains boron oxide which derives the lubricity inherent in the hexagonal boron nitride by being contained in that boron nitride and contributes to the lowering of friction particularly in a high-temperature region; however, the solid lubricant may be constituted without containing the boron oxide. Even in such a case, the hydrated alumina among the components exhibits an effect in the formation of a firm coating layer by improving the adhesiveness of the solid lubricant onto the heat material surface, and exhibits the role of deriving the lubricity of the hexagonal boron nitride by promoting sliding between layers of plate crystals of the hexagonal boron nitride.

In the manufacturing process, this solid lubricant is used in the form of an aqueous dispersion in which an h-BN powder and a boron oxide powder are dispersedly contained in an alumina sol in which hydrated alumina particles are dispersedly contained in water serving as a dispersion medium and containing an acid and whose hydrogen ion concentration (pH) exhibits 2 to 3, the aqueous dispersion dispersedly containing as a solid content 30 to 50% by mass of a lubricating composition containing 70 to 85% by weight of the h-BN powder, 0.1 to 10% by weight of boron oxide, and 5 to 20% by weight of hydrated alumina. Further, the aqueous dispersion may be one in which 30 to 50% by weight of a lubricating composition is dispersedly contained as a solid content, the lubricating composition containing 70 to 85% by weight of the h-BN powder, 0.1 to 10% by weight of boron oxide, and 5 to 20% by weight of hydrated alumina, as well as PTFE dispersedly contained at a ratio of not more than 200 parts by weight, preferably 50 to 150 parts by weight, with respect to 100 parts by weight of that lubricating composition. The h-BN, the boron oxide, and PTFE for forming the aqueous dispersion are preferably as fine powders as possible, and fine powders with an average particle size of 10 μm or less, more preferably 0.5 μm or less, are suitably used as these powders.

The acid which is contained in water serving as a dispersion medium for the alumina sol in the aqueous dispersion acts as a deflocculant for stabilizing the alumina sol. As the acid, it is possible to cite inorganic acids such as hydrochloric acid, nitric acid, sulfuric acid, and amidesulfuric acid, but nitric acid, in particular, is preferable.

The hydrated alumina for forming the alumina sol in the aqueous dispersion is a compound which is expressed by a composition formula: $Al_2O_3 \cdot nH_2O$ (in the composition formula, $0<n<3$). In the composition formula, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot H_2O$) and diaspore ($Al_2O3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of a method of manufacturing the spherical annular seal member 35 composed of the above-described constituent materials.

(First Process) As shown in FIG. 5, a hollow cylindrical knitted metal wire net 1, which is formed by knitting a fine metal wire with a diameter of 0.28 to 0.32 mm into a cylindrical shape and whose mesh size is 4 to 6 mm long and 3 to 5 mm wide or thereabouts (see FIG. 7), is passed between rollers 2 and 3, thereby fabricating a belt-shaped metal wire net 4 having a predetermined width D. A reinforcing member 5 is then prepared by cutting the belt-shaped metal wire net 4 into a predetermined length L.

(Second Process) As shown in FIG. 6, a heat-resistant material (a sheet composed of expanded graphite or expanded graphite including at least one of a phosphoric acid and a phosphate) 6 is prepared which has a width d of from 1.10×D to 2.10×D with respect to the width D of the reinforcing member 5, a length l of from 1.30×L to 2.70×L with respect to the length L of the reinforcing member 5, a density of from 1 to 1.15 Mg/m$^3$, and a thickness of from 0.3 to 0.6 mm.

(Third Process) A superposed assembly 12 in which the heat-resistant material 6 and the reinforcing member 5 are superposed one on top of the other is obtained as follows: To ensure that the heat-resistant material 6 is wholly exposed at least on the large-diameter side annular end face 31 which is an annular end face on one axial end side of the partially convex spherical surface 30 (see FIG. 2) in the spherical annular seal member 35 (see FIG. 1), as shown in FIG. 8, the heat-resistant material 6 is made to project in the widthwise direction by a maximum of from 0.1 to 0.8×D from one widthwise end 7 of the reinforcing member 5, which serves as the large-diameter side annular end face 31 of the partially convex spherical surface 30. Also, the amount of widthwise projection, 61, of the heat-resistant material 6 from the end 7 is made greater than the amount of widthwise projection, 62, from the other widthwise end 8 of the reinforcing member 5, which serves as the small-diameter side annular end face 32 of the partially convex spherical surface 30. Further, the heat-resistant material 6 is made to project in the longitudinal direction by a maximum of from 0.3×L to 1.7×L from one longitudinal end 9 of the reinforcing member 5, while the other longitudinal end 10 of the reinforcing member 5 and a longitudinal end 11 of the heat-resistant material 6 corresponding to that end 10 are made to agree with each other.

(Fourth Process) As shown in FIG. 9, the superposed assembly 12 is convoluted with the heat-resistant material 6 placed on the inner side such that heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length l of from 1.30×L to 2.70×L with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 10, the heat-resistant material 6 on an one widthwise end side thereof projects in the widthwise direction by 61 from the one end 7 of the reinforcing member 5, and the heat-resistant material 6 on another widthwise end side thereof projects in the widthwise direction by 62 from the other end 8 of the reinforcing member 5.

(Fifth Process) Another heat-resistant material 6 such as the one shown in FIG. 11 is separately prepared which is similar to the above-described heat-resistant material 6 but has a smaller width d than the width D of the reinforcing member 5 and has a length l of such a measure as to be able to be wound around the tubular base member 13 by one turn.

(Sixth Process) The following aqueous dispersion is prepared: an aqueous dispersion in which an h-BN powder and a boron oxide powder are dispersedly contained in an alumina sol in which hydrated alumina particles are dispersedly contained in water serving as a dispersion medium and containing nitric acid acting as a deflocculant and whose hydrogen ion concentration (pH) exhibits 2 to 3, the aqueous dispersion dispersedly containing as a solid content 30 to 50% by mass of a lubricating composition containing 70 to 85% by weight of the h-BN, 0.1 to 10% by weight of boron oxide, and 5 to 20% by weight of hydrated alumina; or an aqueous dispersion in which 30 to 50% by weight of a lubricating composition is dispersedly contained as a solid content, the lubricating composition containing 70 to 85% by weight of the h-BN, 0.1 to 10% by weight of boron oxide, and 5 to 20% by weight of hydrated alumina, as well as a PTFE powder contained at a ratio of not more than 200 parts by weight, preferably 50 to 150 parts by weight, with respect to 100 parts by weight of that lubricating composition.

An aqueous dispersion (21 to 25.5% by weight of h-BN, 0.03 to 3% by weight of boron oxide, 1.5 to 6% by weight of hydrated alumina, and 70% by weight of water), which dispersedly contains as a solid content 30% by weight of a lubricating composition containing 70 to 85% by weight of h-BN, 0.1 to 10% by weight of boron oxide, and 5 to 20% by weight of hydrated alumina, is applied to one surface of the heat-resistant material 6, shown in FIG. 11, by means of brushing, roller coating, spraying, or the like, and this is dried to thereby fabricate a coating layer 14 of the solid lubricant constituted by that lubricating composition, as shown in FIG. 12.

Alternatively, an aqueous dispersion (7 to 17% by weight of h-BN, 0.009 to 2% by weight of boron oxide, 0.5 to 4% by weight of hydrated alumina, 10 to 20% by weight of PTFE, and 70% by weight of water), in which 30% by weight of a lubricating composition is dispersedly contained as a solid content, the lubricating composition containing 70 to 85% by weight of h-BN, 0.1 to 10% by weight of boron oxide, and 5 to 20% by weight of hydrated alumina, as well as a PTFE powder dispersedly contained at a ratio of not more than 200 parts by weight, preferably 50 to 150 parts by weight, with respect to 100 parts by weight of that lubricating composition, i.e., the lubricating composition containing 23.3 to 56.7% by weight of h-BN, 0.03 to 6.7% by weight of boron oxide, 1.7 to 13.3% by weight of hydrated alumina, and 33.3 to 66.7% by weight of PTFE, is applied to one surface of the heat-resistant material 6 by means of brushing, roller coating, spraying, or the like, and this is dried to thereby fabricate the coating layer 14 of the solid lubricant constituted by that lubricating composition.

(Seventh Process)

<First Method> As shown in FIGS. 13 to 15, the heat-resistant material 6 having the coating layer 14 of the solid lubricant is continuously inserted (see FIG. 13) into the reinforcing member 5 for the outer layer constituted by the hollow cylindrical knitted metal wire net obtained by continuously knitting a fine metal wire with a wire diameter of 0.28 to 0.32 mm by a knitting machine (not shown). The reinforcing member 5 with the heat-resistant material 6 inserted therein is fed, starting with an insertion start end side thereof, into a nip Δ1 between a pair of cylindrical rollers 15 and 16 each having a smooth cylindrical outer peripheral surface, so as to be integrated by being pressurized in the thicknesswise direction of the heat-resistant material 6 (see FIG. 14), thereby filling the meshes of the metal wire net of the reinforcing member 5 for the outer layer with the heat-resistant material 6 and the coating layer 14 of the solid lubricant formed on the surface of the heat-resistant material 6. Thus, a flattened outer-layer forming member 19 is fabricated on the surface of which surfaces 17 constituted by the reinforcing member 5 for the outer layer and surfaces 18 constituted by the solid lubricant are exposed in mixed form.

<Second Method> The reinforcing member 5 constituted by the belt-shaped metal wire net 4 described in the above-described first process is separately prepared, and, as shown in FIG. 16, the heat-resistant material 6 having the coating layer 14 of the solid lubricant is inserted into the reinforcing member 5 for the outer layer constituted by the belt-shaped metal wire net 4, and, as shown in FIG. 17, this assembly is fed into the nip Δ1 between cylindrical rollers 15 and 16 so as to be integrated by being pressurized in the thicknesswise direction of the heat-resistant material 6, thereby filling the meshes of the metal wire net of the reinforcing member 5 for the outer layer with the heat-resistant material 6 and the coating layer 14 of the solid lubricant formed on the surface of that heat-resistant material 6. Thus, the flattened outer-layer forming member 19 is fabricated on the surface of which the surfaces 17 constituted by the reinforcing member 5 for the outer layer and the surfaces 18 constituted by the solid lubricant are exposed in mixed form.

<Third Method> A plain woven metal wire net is prepared as a woven metal wire net which is formed by weaving a fine metal wire with a diameter of 0.28 to 0.32 mm. The reinforcing member 5 for the outer layer made from this plain woven metal wire net is cut to a predetermined length and width, and two of these reinforcing members 5 for the outer layer are prepared. The heat-resistant material 6 having the coating layer 14 of the solid lubricant is inserted between the two reinforcing members 5 for the outer layer, and this assembly is fed into the nip Δ1 between the pair of cylindrical rollers 15 and 16 so as to be integrated by being pressurized in the thicknesswise direction of the heat-resistant material 6, thereby filling the meshes of the metal wire net of the reinforcing member 5 for the outer layer with the heat-resistant material 6 and the coating layer 14 of the solid lubricant formed on the surface of the heat-resistant material 6. Thus, the flattened outer-layer forming member 19 is fabricated on the surface of which the surfaces 17 constituted by the reinforcing member 5 for the outer layer and the surfaces 18 constituted by the solid lubricant are exposed in mixed form.

In the above-described first, second, and third methods, 0.4 to 0.6 mm or thereabouts is suitable as the nip Δ1 between the pair of cylindrical rollers.

(Eighth Process) The outer-layer forming member 19 thus obtained is wound around an outer peripheral surface of the tubular base member 13 with the coating layer 14 placed on the outer side, thereby preparing a cylindrical preform 20 as shown in FIG. 18.

(Ninth Process) A die 27 such as the one shown in FIG. 19 is prepared which has on an inner surface thereof a cylindrical wall surface 21, a partially concave spherical wall surface 22 continuing from the cylindrical wall surface 21, and a through hole 23 continuing from the partially concave spherical wall surface 22, and in which a hollow cylindrical portion 25 and a spherical annular hollow portion 26 continuing from the hollow cylindrical portion 25 are formed inside it as a stepped core 24 provided with concave portions 47 corresponding to the protrusions 41, 42, and 43 is fittingly inserted in the through hole 23. Then, the cylindrical preform 20 is fitted over the stepped core 24 of the die 27.

The cylindrical preform 20 disposed in the hollow cylindrical portion 25 and the spherical annular hollow portion 26 of the die 27 is subjected to compression forming under a pressure of 98 to 294 N/mm² (1 to 3 tons/cm²) in the direction of the core axis. Thus, the spherical annular seal member 35 is fabricated which includes the spherical annular base member 33 having the through hole 28 in a central portion thereof and defined by the cylindrical inner surface 29, the partially convex spherical surface 30, and the large- and small-diameter side annular end faces 31 and 32 of the partially convex spherical surface 30, as well as the outer layer 34 formed integrally on the partially convex spherical surface 30 of the spherical annular base member 33, as shown in FIGS. 1 and 2.

By means of this compression forming, the spherical annular base member 33 is constructed so as to be provided with structural integrity as the heat-resistant material 6 and the reinforcing member 5 are compressed to each other and intertwined with each other. In the outer layer 34, the heat-resistant material 6, the solid lubricant constituted by the lubricating composition, and the reinforcing member 5 made from the metal wire net are compressed such that the solid lubricant and the heat-resistant material 6 are filled in the meshes of the metal wire net of the reinforcing member 5, and the solid lubricant, the heat-resistant material 6, and the reinforcing member 5 are integrated in mixed form, an outer surface 36 of that outer layer 34 being thus formed into a smooth surface 39 in which surfaces 37 constituted by the reinforcing member 5 and surfaces 38 constituted by the solid lubricant are present in mixed form, the cylindrical inner surface 29 is formed with three protrusions 41, 42 and 43 constituted by the heat-resistant material 6 which is press-filled into the concave portions 47 excluding the reinforcing member 5.

In the spherical annular base member 33 and the outer layer 34 of the fabricated spherical annular seal member 35, the reinforcing member 5 constituted by the metal wire net is contained at a ratio of 40 to 65% by weight, and the heat-resistant material 6 containing the expanded graphite and the solid lubricant are contained at a ratio of 35 to 60% by weight. The heat-resistant material 6 and the solid lubricant in the spherical annular base member 33 and the outer layer 34 have a density of 1.20 to 2.00 Mg/m³.

In addition, if attention is focused on the outer layer 34 alone, the reinforcing member 5 constituted by the metal wire net is contained at a ratio of 60 to 75% by weight, and the heat-resistant material 6 containing the expanded graphite and the solid lubricant are contained at a ratio of 25 to 40% by weight.

In the above-described fourth process, if the tubular base member 13 is formed by convoluting the superposed assembly 12 in a state in which the reinforcing member 5 constituted by the belt-shaped metal wire net 4 is placed on the inner side, instead of convoluting the superposed assembly 12 with the heat-resistant material 6 placed on the inner side, it is possible to fabricate the spherical annular seal member 35 in which the reinforcing member 5 constituted by the metal wire net is exposed on the cylindrical inner surface 29 of the spherical annular base member 33.

The spherical annular seal member 35 is used by being incorporated in the exhaust pipe spherical joint shown in FIG. 20. That is, in the exhaust pipe spherical joint shown in FIG. 20, a flange 200 is provided uprightly on an outer peripheral surface of the upstream-side exhaust pipe 100, which is connected to the engine side, by leaving a pipe end portion 101. The spherical annular seal member 35 is fitted over the pipe end portion 101 at the cylindrical inner surface 29 defining the through hole 28, and is seated with the large-diameter side annular end face 31 abutting against that flange 200. A flared portion 301, which integrally has a concave spherical surface portion 302 and a flange portion 303 continuous from the concave spherical surface portion 302, is secured to a downstream-side exhaust pipe 300 disposed in such a manner as to oppose the upstream-side exhaust pipe 100 and is connected to the muffler side. An inner surface 304 of the concave spherical surface portion 302 is in sliding contact with the smooth surface 39 in which the surfaces 37 constituted by the reinforcing member 5 and the surfaces 38 constituted by the solid lubricant are present in mixed form in the outer surface 36 of the outer layer 34 of the spherical annular seal member 35.

In the exhaust pipe spherical joint shown in FIG. 20, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. Further, the exhaust pipe spherical joint is arranged such that relative angular displacements occurring in the upstream- and downstream-side exhaust pipes 100 and 300 are allowed by sliding contact between the smooth surface 39 serving as a sliding surface of the outer layer 34 of the spherical annular seal member 35 and the inner surface 304 of the concave spherical surface portion 302 of the flared portion 301 formed at the end of the downstream-side exhaust pipe 300.

According to the spherical annular seal member 35 in accordance with this embodiment, the spherical annular seal member 35 includes the spherical annular base member 33 defined by the cylindrical inner surface 29, the partially convex spherical surface 30, and the large- and small-diameter side annular end faces 31 and 32 of the partially convex spherical surface 30; and the outer layer 34 formed integrally on the partially convex spherical surface 30 of the spherical annular base member 33, wherein the at least three protrusions 41, 42, and 43, which are formed of expanded graphite capable of being scraped off by the upstream-side exhaust pipe 100 when inserted into the through hole 28 defined by that cylindrical inner surface 29, and which extend continuously between the large-diameter side annular end face 31 and the small-diameter side annular end face 32 in the axial direction X at intervals with each other in the circumferential direction R, are provided integrally on the cylindrical inner surface 29 in such a manner as to protrude from the cylindrical inner surface 29 in a direction toward the axis. Accordingly, the protrusions 41, 42, and 43 can be brought into close contact with the cylindrical outer surface 46 of the upstream-side exhaust pipe 100, thereby making it possible to eliminate the possibility of the spherical annular seal member 35 falling down from the exhaust pipe 100 and improve the assembly workability.

According to the spherical annular seal member 35, the spherical annular base member 33 includes the reinforcing member 5 made from a metal wire net and the heat-resistant material 6 containing expanded graphite and compressed in such a manner as to fill meshes of the metal wire net of the reinforcing member 5 and to be integrated with the reinforcing member 5 in mixed form, and, in the outer layer 34, the heat-resistant material 6 containing expanded graphite, the solid lubricant consisting of a lubricating composition containing at least hexagonal boron nitride and hydrated alumina, and the reinforcing member 5 made from the metal wire net are compressed such that the solid lubricant and the heat-resistant material 6 are filled in the meshes of the reinforcing member 5, and such that the solid lubricant, the heat-resistant material 6, and the reinforcing member 5 are integrated in mixed form, the outer surface 36 of the outer layer 34 being formed into the smooth surface 39 in which the surfaces 37 constituted by the reinforcing member 5 and the surfaces 38 constituted by the solid lubricant are present in mixed form. Accordingly, it is possible to avoid the dropping off of the solid lubricant from the outer surface 36, with the result that since the sliding with the mating member takes place at the smooth surface 39 where the solid lubricant and the reinforcing member 5 are present in mixed form, it is possible to prevent the generation of abnormal frictional noise as practically as possible. In the above-described solid lubricant, hexagonal boron nitride exhibits excellent lubricity particularly in the high-temperature region. In addition, hydrated alumina itself among the components exhibits no lubricity, but exhibits an effect in the formation of a firm coating layer by improving the adhesiveness of the solid lubricant onto the heat material surface, and exhibits the role of deriving the lubricity of the hexagonal boron nitride by promoting sliding between layers of plate crystals of the hexagonal boron nitride.

In the above-described manufacturing method, the outer layer 34 is formed with the outer surface 36 which is formed into the smooth surface 39 where the surfaces 37 constituted by the reinforcing member 5 and the surfaces 38 constituted by the solid lubricant are present in mixed form; however, in the case where the outer layer 34 is formed with the outer surface 36 which is formed into the smooth surface constituted by the solid lubricant, it suffices if the following procedure is adopted. Two reinforcing members 5 for the outer layer in the third method, for example, are superposed on that surface of the heat-resistant material 6 that is opposite to the surface having the coating layer 14 of the solid lubricant, and this superposed assembly is fed into the nip $\Delta 1$ between the pair of cylindrical rollers 15 and 16 so as to be integrated by being pressurized in the thicknesswise direction of the heat-resistant material 6, thereby filling the meshes of the reinforcing member 5 for the outer layer with the heat-resistant material 6 on the reverse surface. The flattened outer-layer forming member 19 is hence fabricated on the obverse surface of which the surface 18 constituted by the coating layer 14 of the solid lubricant is provided, and on the reverse surface of which the reinforcing member 5 and the heat-resistant material 6 are exposed in mixed form. The outer-layer forming member 19 thus obtained is wound around an outer peripheral surface of the tubular base member 13 with the coating layer 14 placed on the outer side, and the cylindrical preform 20 is thereby fabricated.

DESCRIPTION OF REFERENCE NUMERALS

29: cylindrical inner surface
30: partially convex spherical surface
31, 32: annular end face
33: spherical annular base member
34: outer layer
35: spherical annular seal member
41, 42, 43: protrusion

The invention claimed is:
1. A spherical annular seal member for use in an exhaust pipe joint, comprising:
    a spherical annular base member defined by a cylindrical inner surface, a partially convex spherical surface, and large- and small-diameter side annular end faces of said partially convex spherical surface; and an outer layer formed integrally on said partially convex spherical surface of said spherical annular base member,
    wherein at least three protrusions, which are formed of expanded graphite capable of being scraped off by an exhaust pipe when inserted into a through hole defined by said cylindrical inner surface and which extend between said large-diameter side annular end face and said small-diameter side annular end face in an axial direction at intervals with each other in a circumferential direction, are provided integrally on said cylindrical inner surface in such a manner as to protrude from said cylindrical inner surface in a direction toward an axis.

2. The spherical annular seal member according to claim 1, wherein said large-diameter side annular end face is constituted by an annular flat end face which is continuously connected at an annular large-diameter edge thereof to a large-diameter side annular end of said partially convex spherical surface and which is continuously connected at an annular small-diameter edge thereof to one annular axial end of said cylindrical inner surface, and said protrusions extend in the axial direction between the one axial end of said cylindrical inner surface and another axial end thereof.

3. The spherical annular seal member according to claim 1, wherein said large-diameter side annular end face includes an annular flat end face portion which is continuously connected at the annular large-diameter edge to a large-diameter side annular end of said partially convex spherical surface and an annular concave end face portion which is continuously connected at a large-diameter edge thereof to an annular small-diameter edge of the annular flat end face portion and is continuously connected at a small-diameter edge thereof to one annular axial end of said cylindrical inner surface, and said protrusions extend in the axial direction between the one axial end of said cylindrical inner surface and another axial end thereof.

4. The spherical annular seal member according to claim 1, wherein said large-diameter side annular end face includes an annular first concave end face portion which is continuously connected at the annular large-diameter edge to a large-diameter side annular end of said partially convex spherical surface, an annular flat end face portion which is continuously connected at the annular large-diameter edge to an annular small-diameter edge of the first concave end face portion, and an annular second concave end face portion which is continuously connected at the large-diameter edge to an annular small-diameter edge of the annular flat end face portion and is continuously connected at the small-diameter edge to one annular axial end of said cylindrical inner surface, and said protrusions extend in the axial direction between the one axial end of said cylindrical inner surface and another axial end thereof.

5. The spherical annular seal member according to claim 1, wherein said protrusions extend to at least one of the one axial end of said cylindrical inner surface and the other axial end thereof.

6. The spherical annular seal member according to claim 1, wherein said protrusions terminate short of at least one of the one axial end of said cylindrical inner surface and the other axial end thereof.

7. The spherical annular seal member according to claim 1, wherein said protrusions terminate short of one of the one axial end of said cylindrical inner surface and the other axial end thereof, and extend to another one of the one axial end of said cylindrical inner surface and the other axial end thereof.

8. The spherical annular seal member according to claim 1, wherein said protrusions extend continuously or discontinuously in the axial direction.

9. The spherical annular seal member according to claim 1, wherein said protrusions extend linearly in parallel with the axial direction, spirally in such a manner as to be inclined with respect to the axial direction, or in a corrugated manner in the axial direction.

10. The spherical annular seal member according to claim 1, wherein said at least three protrusions are arranged at equal intervals with each other in a circumferential direction.

11. The spherical annular seal member according to claim 1, wherein said cylindrical inner surface has an inside diameter with respect to an outside diameter of a cylindrical outer surface of the exhaust pipe to ensure that a clearance more than a fitting clearance is not produced with respect to the cylindrical outer surface of the exhaust pipe inserted.

12. The spherical annular seal member according to claim 1, wherein said spherical annular base member includes a reinforcing member made from a metal wire net and a heat-resistant material containing expanded graphite and compressed in such a manner as to fill meshes of the metal wire net of said reinforcing member and to be integrated with said reinforcing member in mixed form, and, in said outer layer, said heat-resistant material containing expanded graphite, a solid lubricant consisting of a lubricating composition containing at least hexagonal boron nitride and hydrated alumina, and said reinforcing member made from the metal wire net are compressed such that said solid lubricant and said heat-resistant material are filled in the meshes of said reinforcing member, and such that said solid lubricant, said heat-resistant material, and said reinforcing member are integrated in mixed form, an outer surface of said outer layer being formed into a smooth surface in which surfaces constituted by said reinforcing member and surfaces constituted by said solid lubricant are present in mixed form or into a smooth surface constituted by said solid lubricant.

13. The spherical annular seal member according to claim 12, wherein said lubricating composition contains a polytetrafluoroethylene resin.

14. The spherical annular seal member according to claim 12, wherein the hydrated alumina is selected from among alumina monohydrate, alumina trihydrate, and pseudoboehmite.

* * * * *